UNITED STATES PATENT OFFICE.

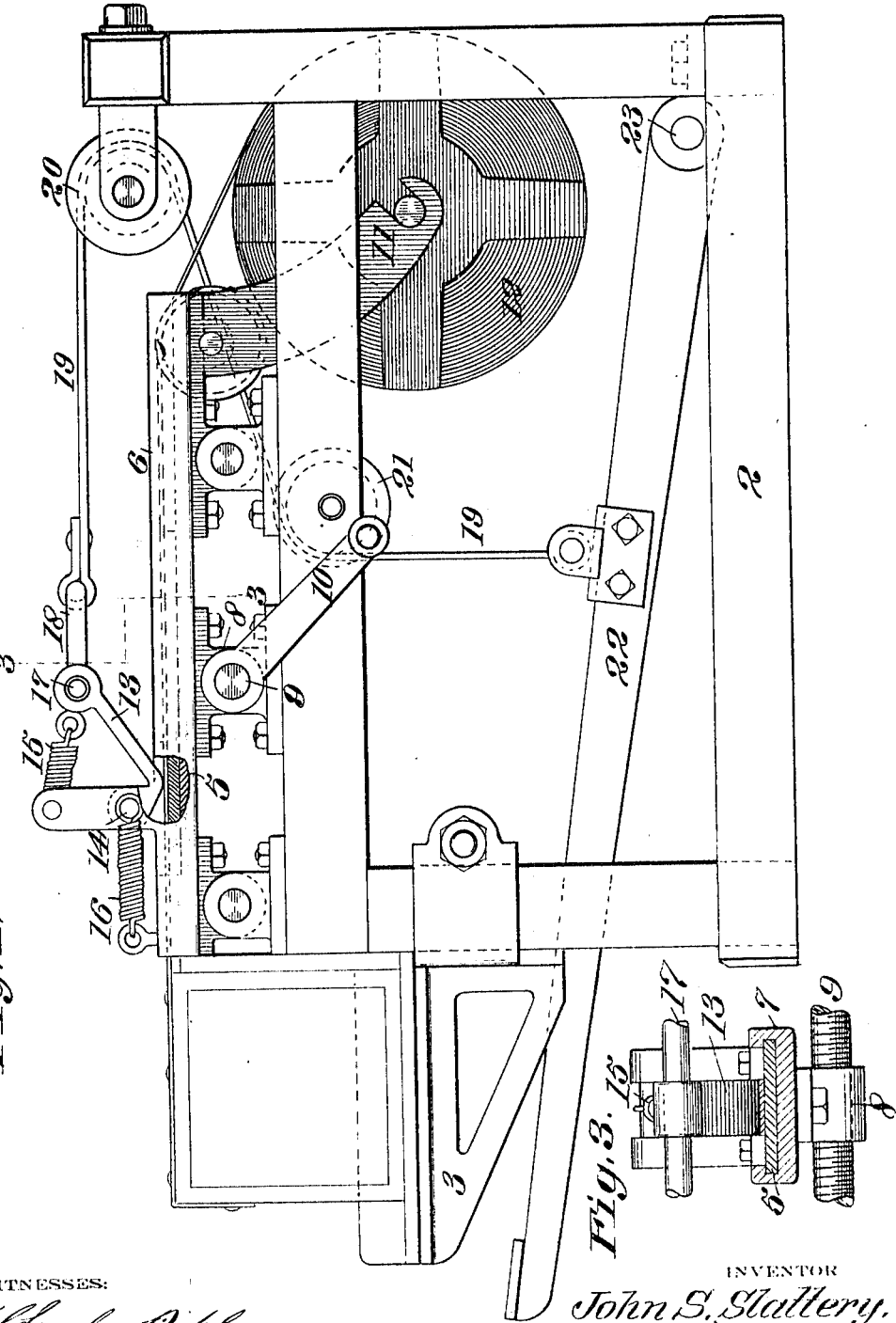

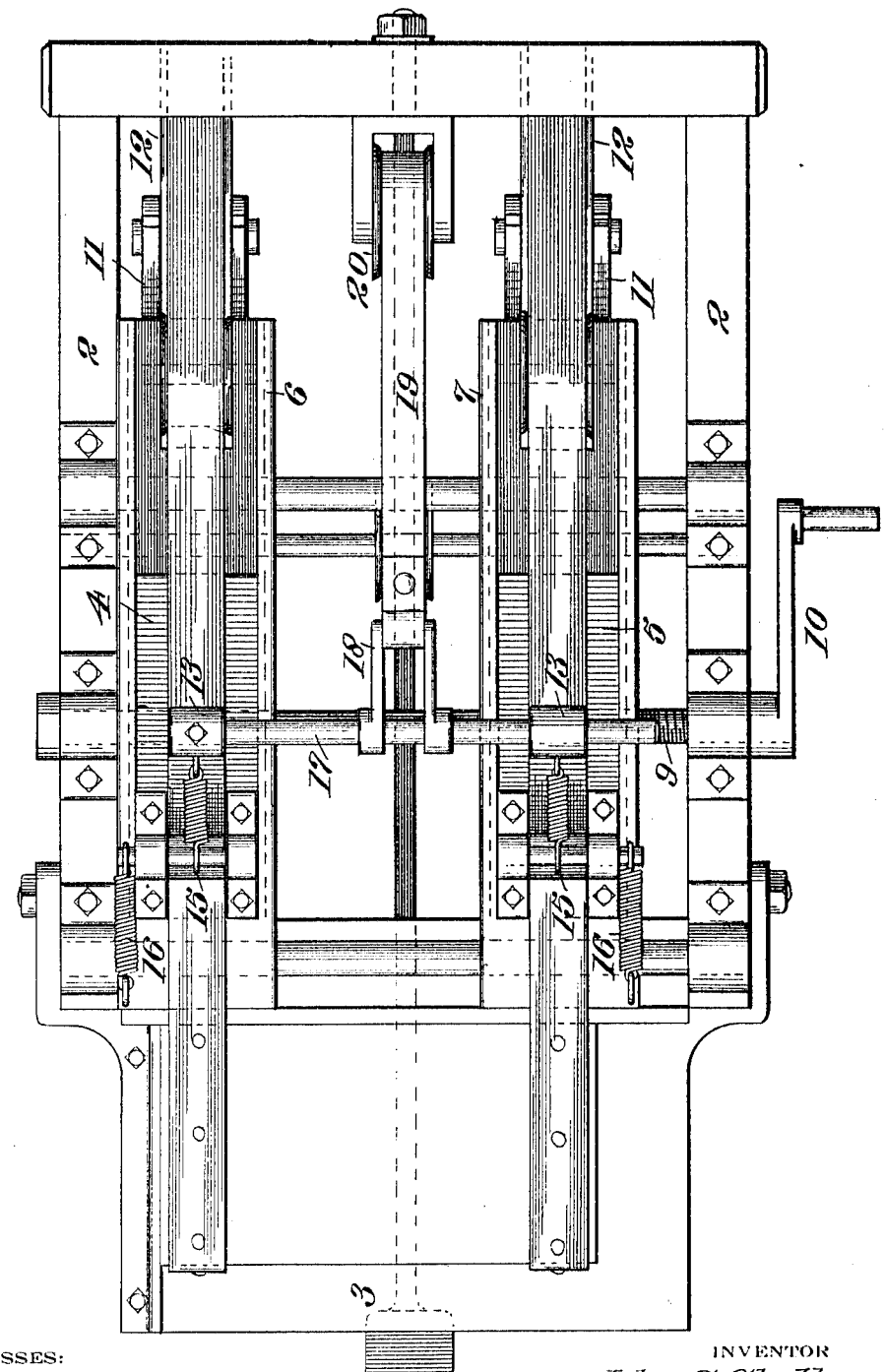

JOHN S. SLATTERY, OF MARYSVILLE, CALIFORNIA, ASSIGNOR OF ONE-HALF TO ARTHUR B. MILLER, OF MARYSVILLE, CALIFORNIA.

BOX-STRAPPING APPARATUS.

1,119,996.      Specification of Letters Patent.      Patented Dec. 8, 1914.

Application filed June 16, 1914. Serial No. 845,430.

*To all whom it may concern:*

Be it known that I, JOHN S. SLATTERY, a citizen of the United States, residing at Marysville, in the county of Yuba and State of California, have invented new and useful Improvements in Box-Strapping Apparatus, of which the following is a specification.

This invention relates to an apparatus whereby the binding of boxes with metal binding straps may be greatly facilitated, and with which the tension of the straps as nailed to a box can be properly and easily controlled.

The object of the invention is to provide in a box-strapping apparatus means for tensioning a plurality of straps simultaneously, and to provide means in the apparatus for adjusting the parallel spacing of the straps to accommodate the operation of the apparatus to boxes of different sizes.

The invention consists of the parts and the construction and combination of parts as hereinafter more fully described and claimed, having reference to the accompanying drawings, in which—

Figure 1 is a side elevation of the apparatus partly in section. Fig. 2 is a plan view thereof. Fig. 3 is a detail cross section on line 3—3, Fig. 1.

2 shows a suitable type of frame having a front horizontal portion forming a table 3 upon which boxes to be strapped may be placed. Mounted upon the uppermost horizontal portion of the frame 2 are parallel carriages 4—5 reciprocating in appropriate guide-ways 6—7, one of the carriages, as 5, being provided with a depending portion carrying a nut 8 engageable by a horizontal transversely extending screw 9 with a crank 10 at one end and supported in suitable journals on the frame 2; the carriage with the nut 8 being shiftable transversely upon frame 2 by the turning of the screw. For each carriage there is provided a bracket device 11 for receiving reels 12 of binding metal; the ends of which are led forwardly over respective carriages 4—5 which are provided with clamp dogs 13, pivoted at 14, and between the lower portions of which dogs and the upper surface of their respective carriages the binding strip is passed forwardly so that the end may be nailed to the box to be strapped. The strap dogs 13 are normally counter-balanced by springs 15 which permit the binding strap or material to be drawn freely beneath the dogs 13. The carriages 4—5 are normally drawn forward against suitable stop shoulders of the ways 6—7 by springs 16.

After the binding straps, one for each end of the box, have been led forwardly beneath the strap dogs 13 and their ends nailed to the box, the operator then tensions the straps through a mechanism which includes a transverse rod 17, which is mounted in the outer ends of the strap dogs 13, upon which is pivoted a shackle 18 to which is connected a flexible member such as a cable or wire 19 which passes over a guide pulley 20 at the rear end of the machine, and thence forwardly over a guide pulley 21 at the front of the machine, whence it is led downwardly and connects with a foot pedal 22 pivoted at the rear end of the machine at 23.

The operation of the tension mechanism is as follows: After the strap ends have been nailed to the box corners, the operator then presses down upon the pedal 22, and through the connection 19 swings the dogs 13 down to binding engagement with the strap metal passing therebetween and over the carriages, after which preliminary movement the continued pressure of the foot upon the pedal 22 and the biting of the dogs 13 upon the strap metal within the carriages are then subjected to a rearward pulling force, the resulting movement of which tensions the straps over one surface of the box during which time the operator nails the strap down. Having tensioned the straps over one side of the box and nailed them down, pressure is relieved from the foot pedal 22, whereupon the carriage springs 16 retract the carriages to the forward position and the dogs 13 release the strap material, whereupon the box is then turned over so as to present another side for strapping, and the pedal 22 is again depressed to tension the straps while they are being nailed to the box side; this operation being repeated for each side of the box.

Having thus described my invention, what I claim and desire to secure by Letters Patent is:

1. In a box-strapping apparatus, a pair of horizontal guide-ways, a carriage slidable in each of the guide-ways, a reel carrier connected to each guide-way, a pivoted spring retractile, strap clamp on each carriage, a spring connected to each carriage to retract same, a transverse rod connecting the clamps to cause same to move in unison, a pulley to the rear of said rod, and a second pulley beneath the rod and located in advance of the first pulley, a flexible member connected to the rod and passed over both of the pulleys and extending downwardly from the second pulley, and a foot treadle connected to the lower end of said flexible member.

2. In a box-strapping apparatus, a pair of guide-ways, a carriage slidable in each of the guide-ways, a reel carrier connected to each guide-way, strap-gripping means on each carriage, means to mount one of the guide-ways whereby same with the carriage thereof may be moved toward or away from the other guide-way, means connecting the strap-gripping means of the carriages whereby the same will be moved in unison, said connecting means allowing of the aforesaid transverse movement of the slidable guide-way and the carriage thereof, and means to actuate said connecting means.

3. In a box-strapping apparatus, a pair of guide-ways, a carriage slidable in each of the guide-ways, a reel carrier connected to each guide-way, strap-gripping means on each carriage, means to mount one of the guide-ways whereby same with the carriage thereof may be moved toward or away from the other guide-way, means connecting the strap-gripping means of the carriages whereby the same will be moved in unison, said connecting means allowing of the aforesaid transverse movement of the slidable guide-way and the carriage thereof, and means to actuate said connecting means, and a hand-operable crank mechanism to slide said slidable guide-way.

4. In a box-strapping apparatus, a pair of carriages, strap gripping means on each carriage, manually operable means to adjust the space between the carriages, means to connect the strap gripping means to actuate same in unison, and to allow of said adjustment of the space between the carriages, and means to actuate the connecting means in any adjustment of the space between the carriages.

In testimony whereof I have hereunto set my hand in the presence of two subscribing witnesses.

JOHN S. SLATTERY.

Witnesses:
HOBART G. MILLER,
CHAS. L. JONES.

Copies of this patent may be obtained for five cents each, by addressing the "Commissioner of Patents. Washington, D. C."